R. THOMAS.
RAKE.
APPLICATION FILED DEC. 27, 1913.
1,117,108.
Patented Nov. 10, 1914.
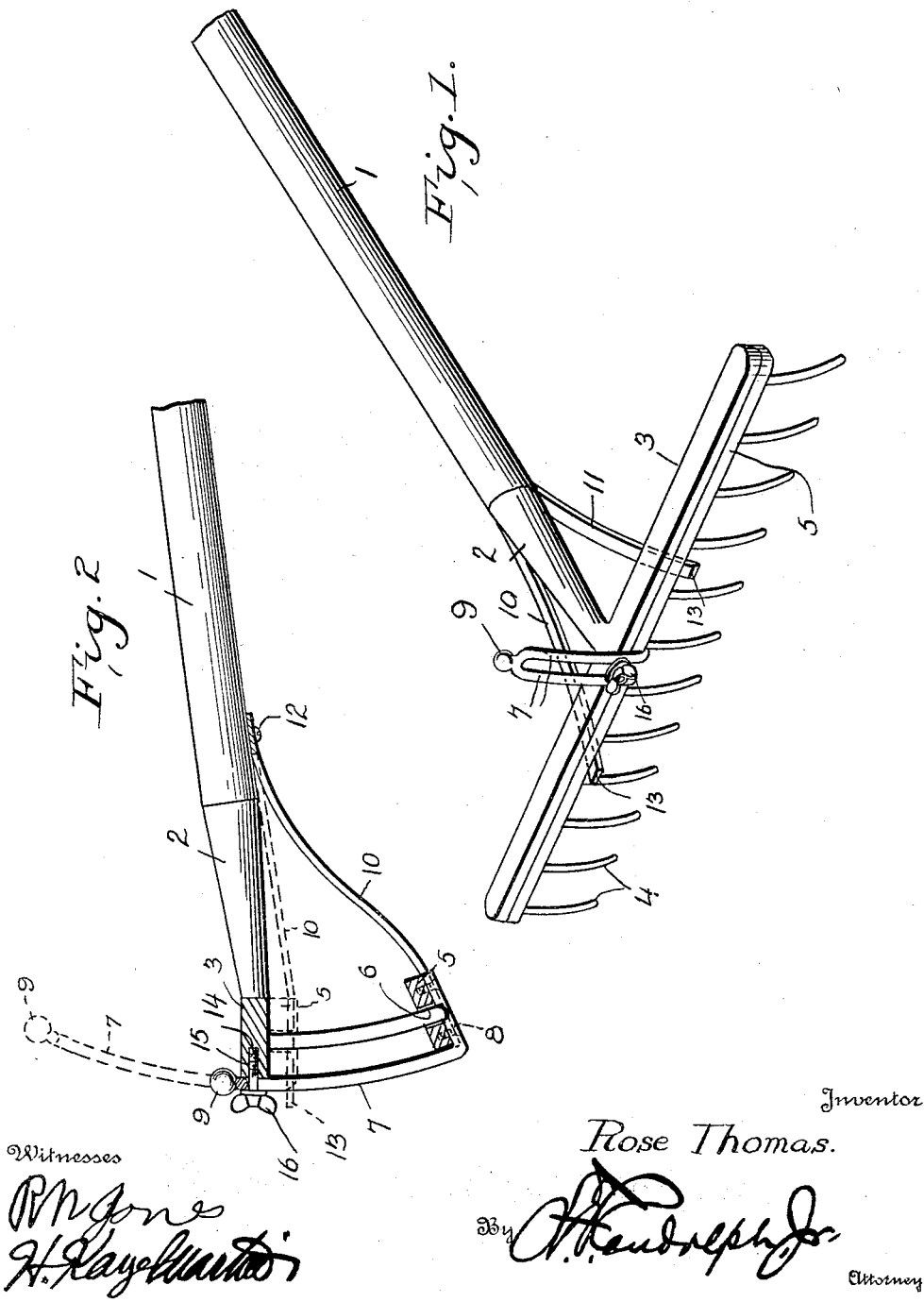
Inventor
Rose Thomas.

UNITED STATES PATENT OFFICE.

ROSE THOMAS, OF FORAKER, OKLAHOMA.

RAKE.

1,117,108.   Specification of Letters Patent.   Patented Nov. 10, 1914.

Application filed December 27, 1913. Serial No. 809,024.

*To all whom it may concern:*

Be it known that I, ROSE THOMAS, a citizen of the United States, residing at Foraker, in the county of Osage and State of Oklahoma, have invented certain new and useful Improvements in Rakes; and I do hereby declare the following to be a full, clear, and exact description of the invention, such as will enable others skilled in the art to which it appertains to make and use the same.

This invention relates to new and useful improvements in rake cleaners, and has for its principal object to provide a simple and effective means by which the teeth of a rake may be stripped of any foreign matter or trash which may have gathered thereon.

Another object of the invention is to provide a stripping device which will automatically return to its raised position and leave the teeth in condition for use.

Still another object of the invention is the provision of a novel combination and arrangement of parts by means of which the above results may be attained, which will be particularly simple in operation, easy to manufacture and cheap in construction.

A still further object of the invention is to provide a guard which is adapted to be locked in its downward position to prevent accident such as a person stepping on the rake teeth and causing injury.

With the above and other objects in view, the invention consists in the novel combination and arrangement of parts as will be fully set forth in the following specification and accompanying drawings, in which—

Figure 1 is a detail perspective view of a rake constructed in accordance with this invention, and Fig. 2 is a longitudinal sectional view of the same.

Referring now to the drawings by characters of reference, the numeral 1 designates a rake handle of the ordinary construction having at one end thereof, the usual ferrule 2. This ferrule tapers as clearly illustrated and is provided at its forward end with the transverse bar 3, which forms the rake head. A plurality of depending curved teeth 4 are secured to the rake head in any suitable manner, and are spaced from each other to form a comb-like structure. These teeth are preferably curved rearwardly as clearly shown to provide for the arcuate swing of the end of the spring which will be more fully hereinafter described.

The stripping which is used in connection with the rake constructed as described above, preferably comprises a single strip of metal or similar material 5 having at spaced intervals the teeth receiving apertures 6 which are arranged to receive the teeth and the walls of said aperture are so constructed as to force any trash from the ends of the teeth when the device is operated. Secured to the bar 5 intermediate its ends is preferably provided the U-shaped member 7, the ends of the arms of which are bent as at 8 and riveted or otherwise secured to the stripping bar. The U-shaped member is preferably bent to conform to the curvature of the teeth as will be seen upon referring to the drawings. A suitable knob or handle 9 is secured to the bight portion of the U-shaped member 7, and is arranged to form a hand hold with which to grasp said member and operate the stripping bar.

A pair of leaf springs 10 and 11 are riveted or otherwise secured as at 12 to the rake handle, while the free ends of the springs are extended as at 13 and secured to the stripping bar as will be clearly seen upon referring to Fig. 2.

An internally screw threaded aperture 14 is formed intermediate the ends of the bar 3 and in direct alinement with the U-shaped member. This aperture 14 is adapted to receive the externally screw threaded stem 15 which projects between the arms of the U-shaped member as shown in Fig. 2 and is provided with the wing nut 16, by means of which the U-shaped member is frictionally engaged.

It will be clearly seen from the foregoing that in use the springs 10 and 11 are arranged to exert upward pressure against the stripping bar 5, and when pressure is applied to the knob 9, the stripping bar will descend toward the ends of the rake teeth and force any trash thereupon. When it is desired to lock the stripping bar at the free ends of the rake teeth, it will be evident that by tightening the wing nut 16, the bar will be held in its downward position and the action of the springs 10 and 11 will be counteracted. In this position, it will be evident that much danger of injury due to coming in contact with rake teeth will be eliminated to a great extent.

While in the foregoing there has been shown and described the preferred embodiment of this invention, it is to be understood that such changes may be made in the combination and arrangement of parts as will come within the scope and spirit of the invention as claimed.

Having thus described my invention, I claim:

1. In a device of the character described, the combination with a rake of a stripping bar, slidable on the rake teeth, springs secured to the handle of the rake and to the stripping bar and adapted to normally hold the stripping bar upwardly, a U-shaped member secured to the stripping bar intermediate its ends and adapted to form a handle to force the stripping bar toward the ends of the rake teeth, and means engaging the U-shaped member and adapted to lock the stripping bar at the free ends of the rake teeth and thereby prevent injury.

2. The combination with a rake comprising a handle, a head and teeth secured to the head, of a threaded shank secured to the rake head intermediate its ends, a wing nut threaded on to the threaded shank, a stripping bar provided with a plurality of apertures slidable on the rake teeth, a U-shaped member secured to the stripping bar intermediate its ends, said U-shaped member straddling the threaded shank and being adapted to be frictionally engaged by the wing nut, springs secured to the rake handle, and to the stripping bar, and adapted to exert upward pressure against the stripping bar to hold the same in its normal raised position, and means carried by the upper end of the U-shaped member to form a hand hold by means of which the U-shaped member may be forced toward the ends of the rake teeth, thereby operating the stripping bar and cleaning the teeth of any trash that may have gathered thereon.

In testimony whereof I affix my signature in presence of two witnesses.

ROSE THOMAS.

Witnesses:
MARY F. WILCOX,
EARNIE LABADIE.

---

Copies of this patent may be obtained for five cents each, by addressing the "Commissioner of Patents, Washington, D. C."